US010692019B2

(12) United States Patent
Goodsitt et al.

(10) Patent No.: US 10,692,019 B2
(45) Date of Patent: Jun. 23, 2020

(54) FAILURE FEEDBACK SYSTEM FOR ENHANCING MACHINE LEARNING ACCURACY BY SYNTHETIC DATA GENERATION

(71) Applicant: Capital One Services, LLC, McLean, VA (US)

(72) Inventors: Jeremy Goodsitt, Champaign, IL (US); Anh Truong, Champaign, IL (US); Reza Farivar, Champaign, IL (US); Fardin Abdi Taghi Abad, Champaign, IL (US); Mark Watson, Sedona, AZ (US); Vincent Pham, Champaign, IL (US); Austin Walters, Savoy, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/537,921

(22) Filed: Aug. 12, 2019

(65) Prior Publication Data

US 2020/0111019 A1    Apr. 9, 2020

Related U.S. Application Data

(63) Continuation-in-part of application No. 16/151,407, filed on Oct. 4, 2018, and a continuation-in-part of application No. 16/151,431, filed on Oct. 4, 2018, and a continuation-in-part of application No. 16/151,385, filed on Oct. 4, 2018, now Pat. No. 10,460,235.

(Continued)

(51) Int. Cl.
*G06N 20/00*    (2019.01)
*G06K 9/62*    (2006.01)

(52) U.S. Cl.
CPC .......... *G06N 20/00* (2019.01); *G06K 9/6256* (2013.01); *G06K 9/6267* (2013.01)

(58) Field of Classification Search
None
See application file for complete search history.

(56) References Cited

U.S. PATENT DOCUMENTS

| 10,339,470 B1* | 7/2019 | Dutta | G06N 20/00 |
| 2019/0171428 A1* | 6/2019 | Patton | G06N 20/00 |
| 2019/0260775 A1* | 8/2019 | Bartos | G06F 21/566 |

OTHER PUBLICATIONS

Beaulieu-Jones et al., Privacy-preserving generative deep neural networks support 1 clinical data sharing, 7/52017, bioRxiv, total pp. 40, http://dx.doi.org/10.1101/159756 (Year: 2017).*

(Continued)

*Primary Examiner* — Alan Chen
(74) *Attorney, Agent, or Firm* — Hunton Andrews Kurth LLP

(57) ABSTRACT

An exemplary system, method, and computer-accessible medium can include, for example, (a) receiving a dataset(s), (b) determining if a misclassification(s) is generated during a training of a model(s) on the dataset(s), (c) generating a synthetic dataset(s) based on the misclassification(s), and (d) determining if the misclassification(s) is generated during the training of the model(s) on the synthetic dataset(s). The dataset(s) can include a plurality of data types. The misclassification(s) can be determined by determining if one of the data types is misclassified. The dataset(s) can include an identification of each of the data types in the dataset(s).

14 Claims, 10 Drawing Sheets

Related U.S. Application Data

(60) Provisional application No. 62/694,968, filed on Jul. 6, 2018.

(56) References Cited

OTHER PUBLICATIONS

Park et al., Data Synthesis based on Generative Adversarial Networks, Aug. 2018, Proceedings of the VLDB Endowment, vol. 11, No. 10, pp. 1071-1083 (Year: 2018).*

Malekzadeh et al., Replacement AutoEncoder: A Privacy-Preserving Algorithm for Sensory Data Analysis, 2018 IEEE/ACM Third International Conference on Internet-of-Things Design and Implementation, pp. 166-176 (Year: 2018).*

Brkic et al., I Know That Person: Generative Full Body and Face De-Identification of People in Images, 2017 IEEE Conference on Computer Vision and Pattern Recognition Workshops, pp. 1319-1328 (Year: 2017).*

"How to handle Imbalanced Classification Problems in Machine Learning?", [retrieved on Sep. 7, 2018]. Retrieved from Internet URL: https://datahack.analyticsvidhya.com/contest/wns-analytics-hackathon-2018/?, 35 pages.

* cited by examiner

FAILURE FEEDBACK SYSTEM FOR ENHANCING MACHINE LEARNING ACCURACY BY SYNTHETIC DATA GENERATION

CROSS-REFERENCE TO RELATED APPLICATION(S)

This application is a continuation-in-part of U.S. patent application Ser. Nos. 16/151,385, 16/151,407, and 16/151,431, all of which were filed on Oct. 4, 2018, the entire disclosures of which are incorporated herein by reference. This application also relates to and claims priority from U.S. Patent Application No. 62/694,968, filed on Jul. 6, 2018, the entire disclosure of which is also incorporated herein by reference.

FIELD OF THE DISCLOSURE

The present disclosure relates generally to improving model performance, and more specifically, to exemplary embodiments of an exemplary system, method, and computer-accessible medium for supplementing training data with synthetic data based on determining misclassifications in models.

BACKGROUND INFORMATION

Customer behavior modeling is the creation of a mathematical model to represent the common behaviors observed among particular groups of customers in order to predict how similar customers will behave under similar circumstances. Models are typically based on data mining of customer data, and each model can be designed to answer one or more questions at one or more particular periods in time. For example, a customer model can be used to predict what a particular group of customers will do in response to a particular marketing action. If the model is sound and the marketer follows the recommendations it generated, then the marketer will observe that a majority of the customers in the group respond as predicted by the model.

While behavior modeling is a beneficial tool, access to data can present a significant hurdle in training the model. In particular, models need large datasets in order to be properly trained. Only after a model is properly trained can the model be applied. Previously, models were trained on datasets that include information regarding actual people. These datasets, generally referred to as original datasets, include real information about real people, including biographical, demographic, and even financial information about the people in the dataset. Much of this information can be sensitive information, and even though the data in the original dataset can be anonymized, the use of original datasets has significant privacy implications.

In addition to privacy issues in original datasets, original datasets can suffer from a lack of sufficient samples of data to train a model. Problems associated with a small dataset are numerous, but can include (i) over-fitting, which can be more difficult to avoid, and which can result in overfitting the validation set as well, (ii) outliers, which can become much more dangerous, and (iii) noise.

In contrast to original datasets, synthetic datasets can be generated and used to train a model. Synthetic datasets can be based on the original datasets, and/or can include information that is similar to the original datasets. While it is beneficial to use synthetic datasets to train models, it is possible that a model trained with a synthetic dataset can produce misclassifications. Some systems attempt to address these misclassifications by feeding the same synthetic dataset back into a model being trained (e.g., along with the original dataset), weighting the synthetic dataset differently than the original dataset. However, such techniques can be laborious, are manual processes, and still suffer from misclassifications of the data by the model.

Thus, it may be beneficial to provide an exemplary system, method, and computer-accessible medium for determining misclassifications in models and generating target data for improving model performance which can overcome at least some of the deficiencies described herein above.

SUMMARY OF EXEMPLARY EMBODIMENTS

An exemplary system, method, and computer-accessible medium can include, for example, (a) receiving a dataset(s), (b) determining if a misclassification(s) is generated during a training of a model(s) on the dataset(s), (c) generating a synthetic dataset(s) based on the misclassification(s), and (d) determining if the misclassification(s) is generated during the training of the model(s) on the synthetic dataset(s). The dataset(s) can include a plurality of data types. The misclassification(s) can be determined by determining if one of the data types is misclassified. The dataset(s) can include an identification of each of the data types in the dataset(s).

In some exemplary embodiments of the present disclosure, a classification score can be assigned to each of the data types after the training of the model(s). The misclassification(s) can be determined based on the assigned classification score. The misclassification(s) can be determined based on the assigned classification score being below a particular threshold. The synthetic dataset(s) can include more of a particular one of the data types than the dataset(s). The model(s) can be a machine learning procedure. The machine learning procedure can be a supervised machine learning procedure.

In certain exemplary embodiments of the present disclosure, the synthetic dataset(s) can be generated after a particular number of misclassifications has been determined. Procedures (b)-(d) can be iterated until the misclassification(s) is no longer determined during the training of the model(s). The synthetic dataset(s) can include non-misclassified data from the dataset(s). The synthetic dataset(s) can be generated after a statistical significance has been achieved based on the misclassification(s).

Additionally, an exemplary system, method, and computer-accessible medium can include, for example, receiving a dataset(s) including an identification of a plurality of data types in the dataset(s), determining if a misclassification(s) of a particular data type(s) of the data types is generated during a training of a model(s) on the dataset(s), generating a synthetic dataset(s) based on the misclassified particular data type(s), where the synthetic dataset(s) includes more of the particular data type(s) than the dataset(s), and determining if the misclassification(s) is generated during the training of the model(s) on the further synthetic dataset(s). A classification score can be assigned to each of the data types. The misclassification(s) can be determined based on the assigned classification score.

Further, an exemplary system, method, and computer-accessible medium can include receiving a dataset(s), determining if a misclassification(s) is generated during a training of a model(s) on the dataset(s), sending a request for a synthetic dataset(s) based on the misclassification, receiving the synthetic dataset(s), and determining if the misclassification(s) is generated during the training of the model(s) on the synthetic dataset(s). The dataset(s) can include a plurality of data types. The request can include a data request for additional data related to a particular one of the data types.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

DETAILED DESCRIPTION OF EXEMPLARY EMBODIMENTS

Figure 1A:
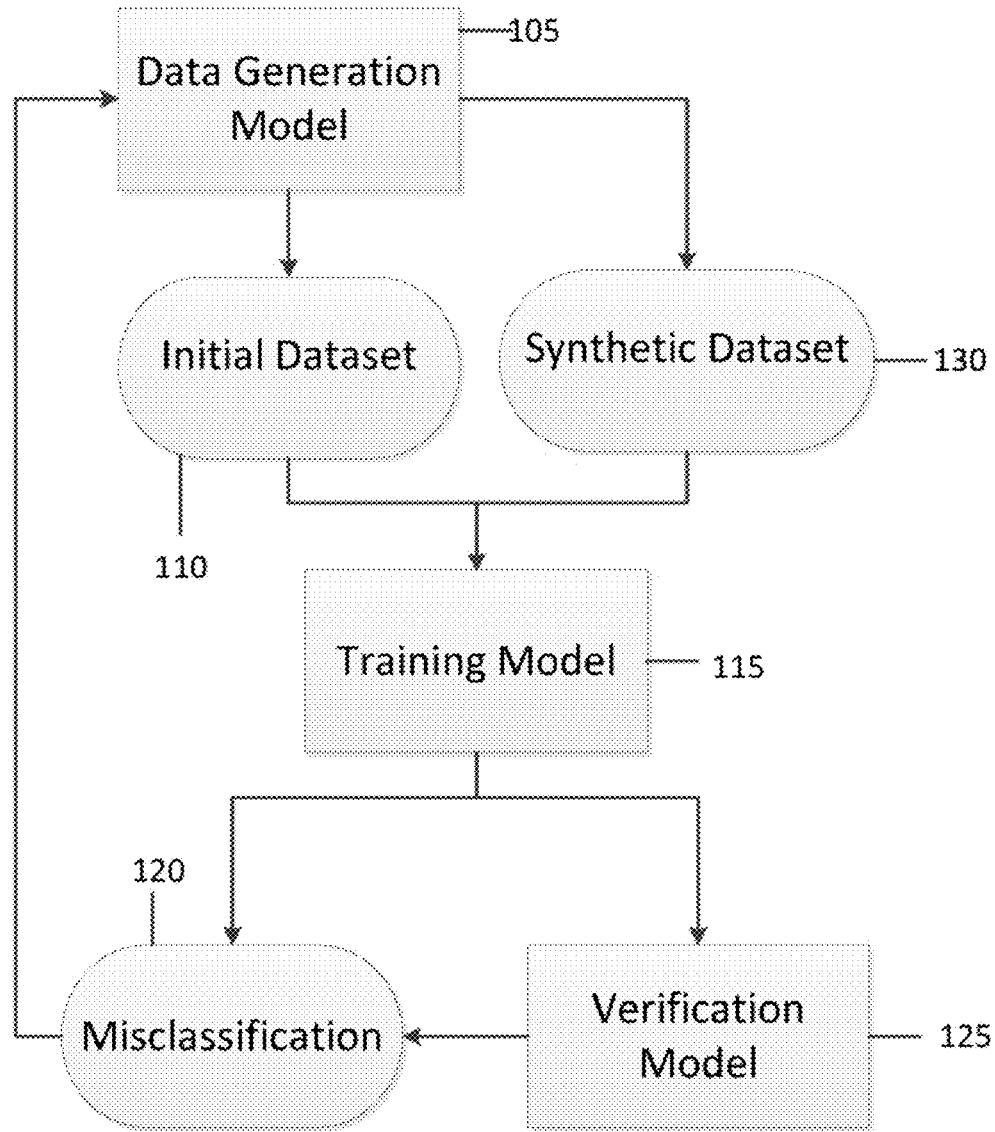
FIG. 1A is a schematic diagram of a system for determining a misclassification from a dataset according to an exemplary embodiment of the present disclosure.

FIG. 1A is a schematic diagram of a system for determining a misclassification from a dataset according to an exemplary embodiment of the present disclosure. For example, as shown in FIG. 1A, data generation model 105 can be used to generate and/or assemble initial dataset 110 (e.g., which can include a synthetic dataset and/or real original data). Initial dataset can be used to train training model 115. Training model 115 can identify a misclassification 120 resulting from training model 115 on initial dataset 110. Alternatively, or in addition, verification model 125 can be used to identify misclassification 125. If a misclassification is identified, data generation model 105 can be used to generate synthetic dataset 130, which in turn can be used to train training model 115. This can repeat until no misclassifications are present.

Training model 115 can include any suitable model trained using both the initial and synthetic datasets. For example, a machine learning system can be trained on the initial dataset. The exemplary machine learning system can be based on a supervised learning system. For example, the exemplary machine learning system can be trained using data that has been previously labeled as being a particular data type. Data types can include, but are not limited to, customer information, demographic information, purchase history, employee information, or any information regarding a user, customer, or employee, etc. Supervised learning problems can be grouped into regression and classification problems. A classification problem can include an output variable as a category, such as "high risk" or "low risk". A regression problem can include an output variable as a real value, for example, "dollars" or "weight". Exemplary supervised learning procedures that can be used with the exemplary system, method, and computer-accessible medium can include, but are not limited to, (i) linear regression, (ii) random forest, and support vector machines.

Figure 1B:
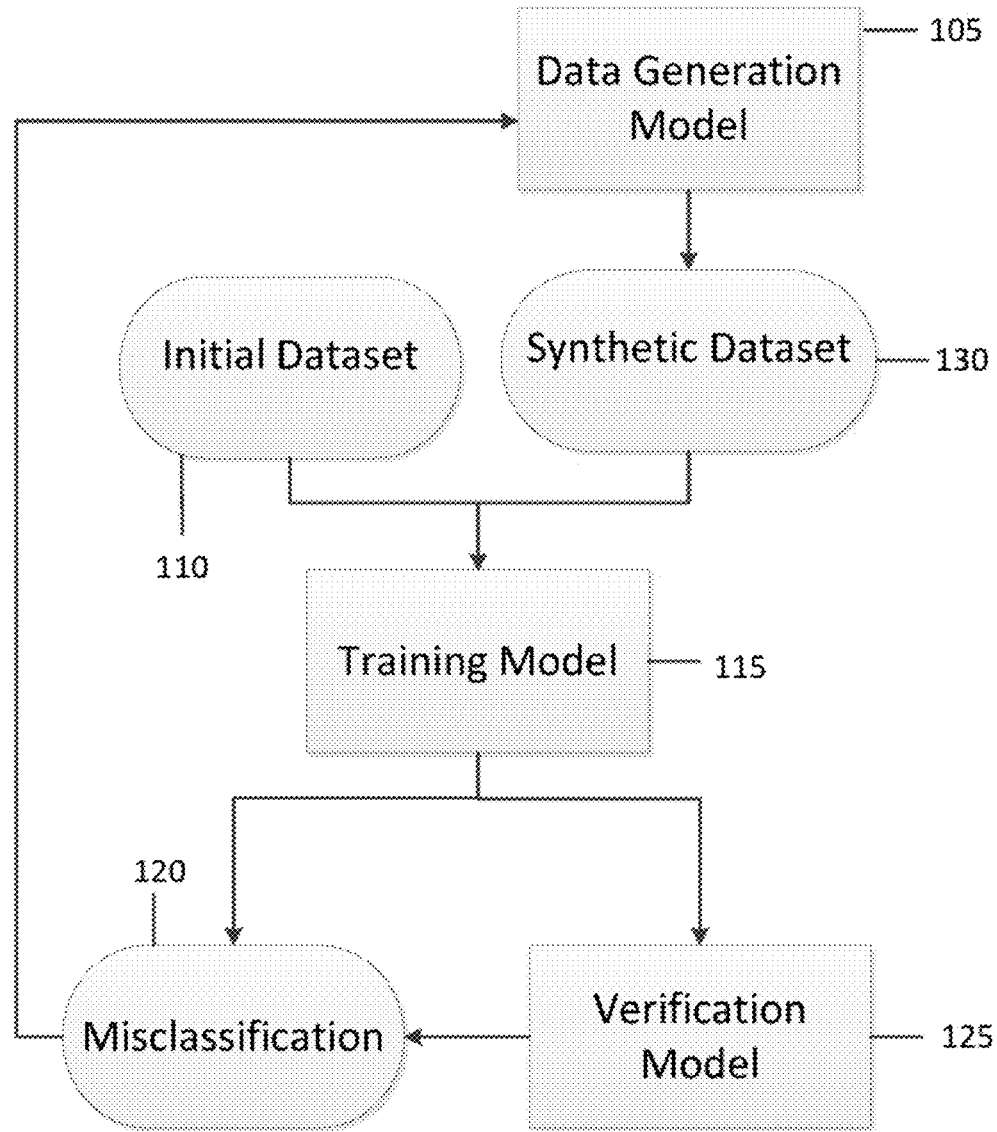
FIG. 1B is a further schematic diagram of a system for determining a misclassification from a dataset according to an exemplary embodiment of the present disclosure.

FIG. 1B is a schematic diagram of a further system for determining a misclassification from a dataset according to an exemplary embodiment of the present disclosure. The system shown in FIG. 1B can be similar to the system shown in FIG. 1A, except that initial dataset 110 can be received, and can be composed entirely of real data. Alternatively, initial dataset 110 can be composed of a combination of real and synthetic data. The real data included in initial dataset 110 can be used to train training model 115. Training model 115 can identify a misclassification 120 resulting from training model 115 on initial dataset 115. Alternatively, or in addition, verification model 125 can be used to identify misclassification 125. If a misclassification is identified, data generation model 105 can be used to generate synthetic dataset 130, which in turn can be used to train training model 115. Training model 115 can then be trained only on synthetic dataset 130, or a combination of initial dataset 110 and synthetic dataset 130. This can repeat until no misclassifications are present.

The exemplary model can also include a semi-supervised machine learning procedure. This can include, for example, where there is a large amount of input data and only some of the input data is labeled. A semi-supervised machine learning procedure can be considered a combination of a supervised and an unsupervised machine learning procedure. Many models fall into this area between a supervised and an unsupervised machine learning procedure. This is because it can be expensive or time-consuming to label data. In contrast, unlabeled data can be cheap and easy to collect and store. However, the exemplary system, method, and computer-accessible medium can be used to automatically generate or receive synthetic data that has been specifically labeled for a supervised learning procedure.

For example, a further exemplary model (e.g., a data generation model) can be used to generate both the initial dataset and/or the synthetic dataset. The data generation model can include input parameters of the type of data to be generated. The output of the data generation model can include an initial dataset generated based on the parameters. The data generation model can also include a portion of the synthetic dataset in the initial dataset in order to train the training model. Prior to training the training model, the data generation model can generate an initial dataset. This initial dataset generated by the data generation model, which may include some combination of real and synthetic data, may or may not tag or identify the data types within the initial dataset.

After the initial dataset is generated, it can be provided to a training model. The exemplary data generation model can be included, or can be a part of, the exemplary system, method, and computer-accessible medium. Alternatively, the training model can send a request to the data generation model. The request can include parameters for generating the initial dataset. Alternatively, the initial dataset can have been previously generated prior to the generation of the training model. Once a request for an initial dataset is received by the data generation model, the initial dataset is generated and provided to the training model. The training model can then be trained using the initial dataset. As described above, the data generated by the data generation model can be fully or partially tagged. For example, some or all of the data types can be tagged in the initial dataset. In such an exemplary case, the training model can be a supervised or a semi-supervised training model.

After the training model is initially trained on the initial dataset, or during the training of the model, a determination can be made as to whether the training model misclassified any of the data in the initial dataset. This can be based on a certain number or pieces of data being misclassified and collected/stored, or the determination of a statistical significance as discussed below. The misclassification can include, but is not limited to, a misclassification of one or more data types that have previously been tagged by the data generation model. The misclassification can be determined directly by the training model (e.g., the output of the training model can include an identification of one or more misclassifications). Alternatively, or in addition, a further model (e.g., a verification model) can be employed to check the results of the training model. The verification model can be a model that has been previously trained (e.g., on synthetic or non-synthetic data). If the training model is not used to identify the misclassification, then the verification model can verify the accuracy of the training model, which can be based on the results of the training model and information regarding the initial dataset. If the training model generated the identification of the misclassification, then the verification model can be used to verify the misclassifications identified by the training model.

For non-categorical datasets, a user-defined function can be used to determine a failure in the model being trained. For example, a user training the model can define certain parameters for the expected values or results of training of the model. If the actual produced value differs from the expected value, then the training model can be deemed to have provided a failure. User-defined functions can include, various suitable procedures for determining a deviation between the expected value and the produced value, including, but not limited to, the variance, which can be based on the number of standard deviations the produced value is away from the expected value (e.g., one, two, or three standard deviations, although not limited thereto). The user-defined function can also be based on a set distribution produced In addition to determining whether the training model misclassified any data in the initial dataset, a determination of misclassified data can also be performed during the training of the model. This can provide real-time feedback regarding the performance or accuracy of the model being trained. For example, during the training of the model, a count of the number of misclassifications can be determined (e.g., continuously, or at predetermined intervals). Once the count reaches a certain threshold number, the misclassified data can be used to separately generate more samples of the same type of data (e.g., while the model is still being trained on the initial dataset). This newly generated data can then be input into the model while it is being trained. In such an exemplary case, the counter can be reset, and new synthetic data can be generated after the count again reaches a particular threshold.

When training the training model and determining any misclassifications, the number of samples or data points used to determine the misclassification can be based on a statistical significance. In statistical hypothesis testing, a result can have statistical significance when it is unlikely to have occurred given a null hypothesis. For example, a defined significance level, $\alpha$, is the probability of the study rejecting the null hypothesis, given that it were true and the p-value of a result, p, is the probability of obtaining a result at least as extreme, given that the null hypothesis were true. The result can be statistically significant, by the standards of the study, when $p<\alpha$. The significance level for a study can be chosen before data collection, and typically can be set to a particular number depending on the experiments. Additionally, in any experiment or observation that involves drawing a sample from a population, there is always the possibility that an observed effect would have occurred due to sampling error alone. But if the p-value of an observed effect is less than the significance level, an investigator may conclude that the effect reflects the characteristics of the whole population, thereby rejecting the null hypothesis.

If no misclassifications are identified by either the training model or the verification model, then the training model can be considered fully trained. If a misclassification has been identified, the specific cause of the misclassification can be determined (e.g., the data causing the misclassification, or the data that the misclassification is based on, can be identified). In order to eliminate the misclassification, it can be beneficial to retrain the training model based on a dataset that includes more data samples of the type that was misclassified. Additionally, in order to eliminate the misclassification, additional synthetic data can be provided to the model during training.

For example, the information that results from the misclassification (e.g., the misclassification and/or the identification of the specific data type that caused the misclassification) can be input into a data generation model that may be used to generate a synthetic dataset. The synthetic dataset can be specifically based on the misclassification. For example, the synthetic dataset can be generated based on only data that caused the misclassification and thus may relate to only the data that caused the misclassification. The synthetic dataset can then be combined with the initial dataset, which results in a combined dataset that has more samples of the misclassified data than was occurring in the initial dataset. For example, the data generation model can be configured to generate (e.g., upsample) the increased number of samples of the misclassified sample. The generation of the additional samples of misclassified data can be performed based on the procedures described below. For example, samples of the misclassified data can be input into a data generation model, as described below, to generate additional samples of the misclassified data. The number, or amount, of additional samples needed, can be automatically determined based on the rate of misclassifications (e.g., data types that have a higher rate of misclassification can have more additional samples generated than data types with lower rates of misclassifications). Additionally, a user can specify the number of additional samples to generate.

After the additional samples of the misclassified data have been generated, the training model can be retrained (e.g., after an initial training) on this combined dataset to determine if the same misclassification is still present or the training model can be continuously trained based on the dataset (e.g., by adding additional synthetic data during the training of the model). If a misclassification is still present, then a determination can again be made as to what data caused the misclassification. The data that caused the misclassification can be the same data that caused the previous misclassification. In such a case, an additional synthetic dataset can be generated to include even more samples of the same data. However, it can be possible that the new misclassification is based on different data. Thus, an even further synthetic dataset can be generated based on this data type, not the previous data type that caused the misclassification.

In some exemplary embodiments, the synthetic dataset only includes more samples of the misclassified data, and is then combined with the initial synthetic dataset, the combination of which is used to train the training model. Alternatively, or in addition, the synthetic dataset can be based on the misclassified data as well as the initial dataset. Thus, the synthetic dataset can include more samples of the misclassified data than the initial dataset, and the synthetic dataset, which includes samples of both correctly classified and misclassified data, can be used to train the training model. Then, as described above, a determination can be made as to whether the same misclassification is still present.

In some exemplary embodiments of the present disclosure, the exemplary system, method, and computer-accessible medium can be a serial process. For example, only one misclassification can be determined at a time, and the synthetic dataset can include more of the single type of data that caused the misclassification. Alternatively, the exemplary system, method, and computer-accessible medium can identify more than one misclassification at a time in the initial dataset. In such a case, the synthetic dataset can include the one or more data types that cause the misclassification. The training model can then be trained on the synthetic dataset, which includes multiple types of misclassified data. This process can repeat until no misclassifications are identified.

As discussed above, the same data generation model that generated the initial dataset can be used to generate the synthetic dataset. Alternatively, the misclassified data can be provided to a further data generation model. The further data generation model can be specifically generated/developed based on the misclassification. For example, the further data generation model can be specifically developed only to generate more of the data type that has been misclassified (e.g., more of the one or more data types that have been misclassified depending on whether the exemplary system, method, and computer-accessible medium is operating serially or not). The further data generation model can be specifically generated after the training model is trained and the misclassification is identified, and then deleted after the generation of the synthetic dataset. Alternatively, the further data generation model can remain active or ready until the misclassification is no longer identified. Then the further data generation model can be deleted, and a new further data generation model can be generated based on additional misclassifications. Additionally, the further data generation model can be employed during a continuous training of the training model to generate additional data to be provided to the training model while the training model is trained.

In some exemplary embodiments of the present disclosure, a single synthetic data generation model can be used to generate all of the data types, or data samples, used to train the training model. Alternatively, multiple synthetic data generation models can be employed. For example, as misclassifications are determined, the misclassifications can be separated by data type, which can include separating by a class or a subclass. Depending on the class or subclass assigned to the data, a different synthetic data generation model can be used. Each of the different synthetic data generation models can be separately trained to specifically produce data for the particular class and or subclass.

Exemplary Synthetic Data Generation

Figure 2:
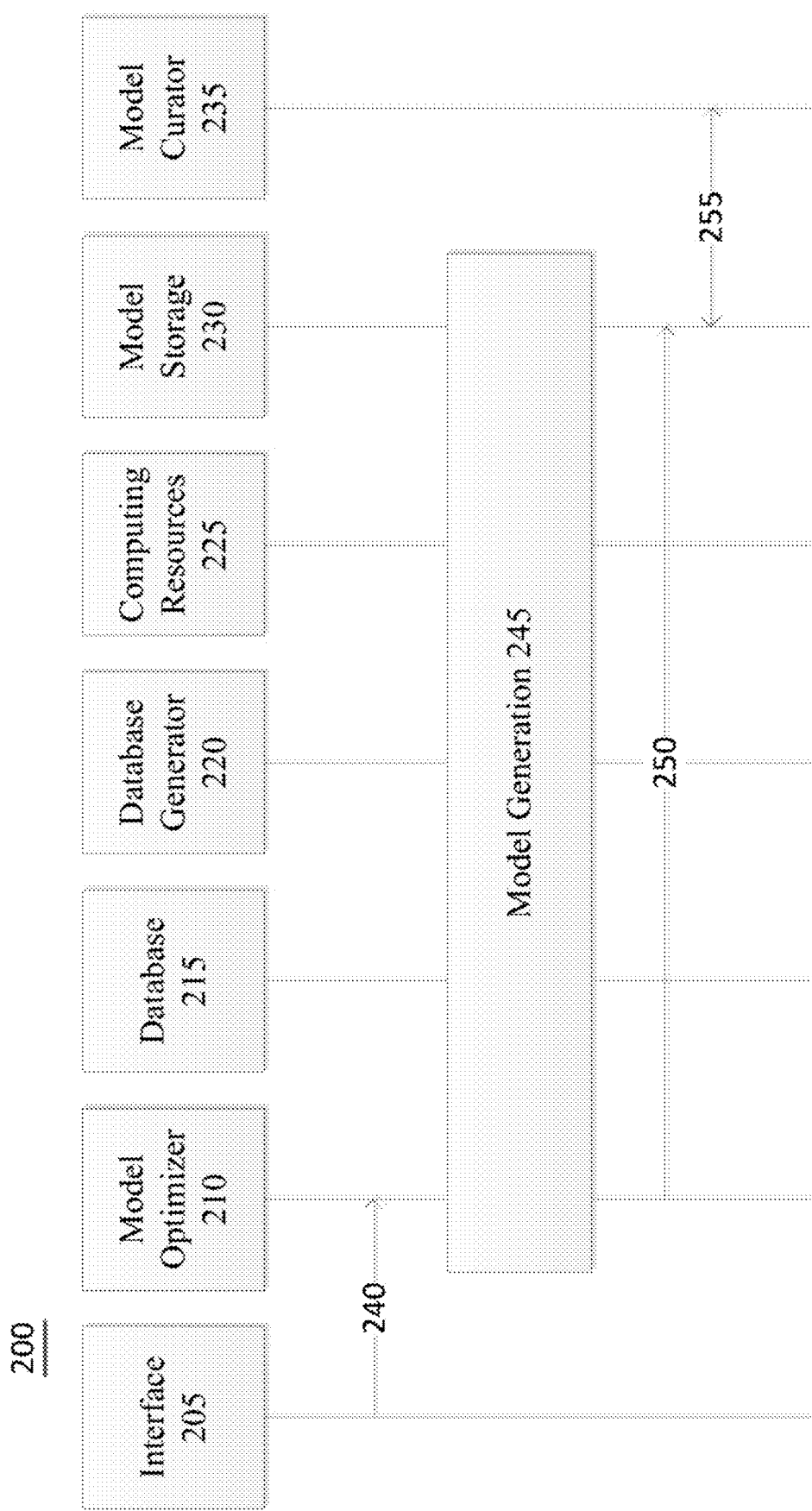
FIG. 2 is a flow diagram of a method for generating data models according to an exemplary embodiment of the present disclosure.

FIG. 2 shows a method 200 for generating data models according to an exemplary embodiment of the present disclosure. Method 200 can be used to generate a data model for a machine learning application. The data model can be generated using synthetic data. The synthetic data can be generated using a synthetic dataset model, which can be generated using actual (e.g., real) data. The synthetic data can be similar to the actual data in terms of values, value distributions (e.g., univariate and multivariate statistics of the synthetic data may be similar to that of the actual data), structure and ordering, or the like. In this manner, the data model for the machine learning application can be generated without directly using the actual data. As the actual data can include sensitive information, and generating the data model can require distribution and/or review of training data, the use of the synthetic data can protect the privacy and security of the entities and/or individuals whose activities are recorded by the actual data.

At procedure step 240, interface 205 can provide a data model generation request to model optimizer 210. The data model generation request can include data and/or instructions describing the type of data model to be generated. For example, the data model generation request can specify a general type of data model (e.g., neural network, recurrent neural network, generative adversarial network, kernel density estimator, random data generator, or the like) and parameters specific to the particular type of model (e.g., the number of features and number of layers in a generative adversarial network or recurrent neural network). The recurrent neural network can include long short term memory modules (e.g., LSTM units), or the like.

At procedure 245, one or more components of a system (e.g., as described below in FIG. 7) can be used to generate a data model. For example, a data model can be trained using computing resources 225 based on data provided by dataset generator 220. This data can be generated using dataset generator 220 from data stored in database 215. The data used to train dataset generator 220 can be actual or synthetic data retrieved from database 215. This training can be supervised by model optimizer 210, which can be configured to select model parameters (e.g., number of layers for a neural network, kernel function for a kernel density estimator, or the like), update training parameters, and evaluate model characteristics (e.g., the similarity of the synthetic data generated by the model to the actual data). Model optimizer 210 can be configured to provision computing resources 225 with an initialized data model for training. The initialized data model can be, or can be based upon, a model retrieved from model storage 230.

At procedure 250, model optimizer 210 can evaluate the performance of the trained synthetic data model. When the performance of the trained synthetic data model satisfies performance criteria, model optimizer 210 can be configured to store the trained synthetic data model in model storage 230. For example, model optimizer 210 can be configured to determine one or more values for similarity and/or predictive accuracy metrics. Based on values for similarity metrics, model optimizer 210 can be configured to assign a category to the synthetic data model.

According to a first category, the synthetic data model can generate data maintaining a moderate level of correlation or similarity with the original data (e.g., data that can match well with the original schema), and does not generate too many row or value duplicates. According to a second category, the synthetic data model may generate data maintaining a high level of correlation or similarity of the original level, and therefore could potentially cause the original data to be discernible from the original data (e.g., a data leak). A synthetic data model generating data failing to match the schema with the original data or providing many duplicated rows and values can also be placed in this category. According to a third category, the synthetic data model can generate data maintaining a high level of correlation or similarity with the original data, likely allowing a data leak. A synthetic data model generating data badly failing to match the schema with the original data or providing far too many duplicated rows and values can also be placed in this category.

The exemplary system can be configured to provide instructions for improving the quality of the synthetic data model. If a user requires synthetic data reflecting less correlation or similarity with the original data, the user can change the models' parameters to make them perform worse (e.g., by decreasing number of layers in GAN models, or reducing the number of training iterations). If the users want the synthetic data to have better quality, they can change the models' parameters to make them perform better (e.g., by increasing number of layers in GAN models, or increasing the number of training iterations). At procedure 255, model curator 235 can evaluate the trained synthetic data model for compliance with governance criteria.

Figure 3:
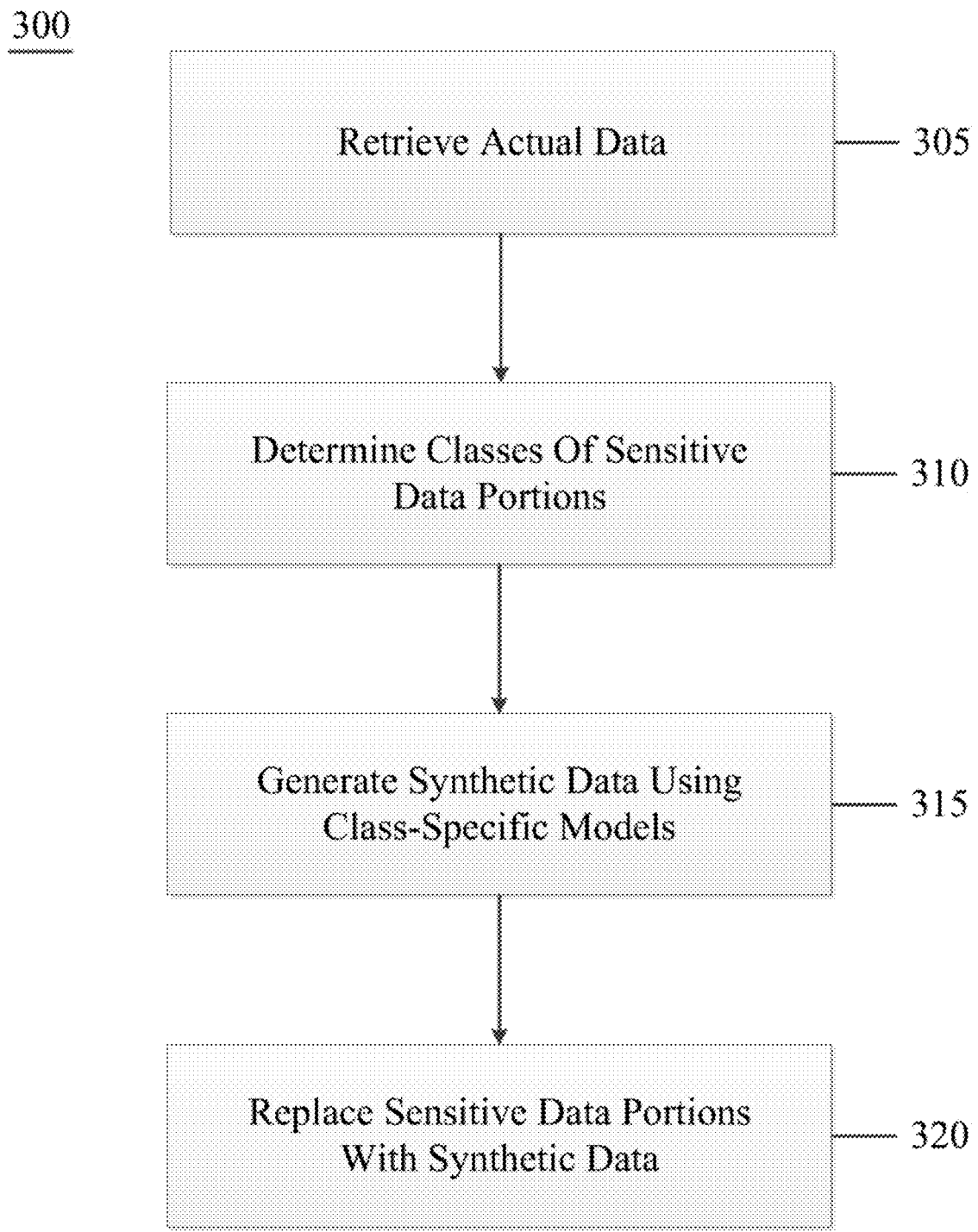
FIG. 3 is a flow diagram of a method for generating synthetic data using class-specific models according to an exemplary embodiment of the present disclosure.

FIG. 3 shows a method 300 for generating synthetic data using class-specific models according to an exemplary embodiment of the present disclosure. The exemplary system, or a similar system, may be configured to use such synthetic data in training a data model for use in another application (e.g., a fraud detection application). Method 300 can include the steps of retrieving actual data, determining classes of the data, and generating synthetic data using a data model for the appropriate class. The data model can be a generative adversarial network trained to generate synthetic data satisfying a similarity criterion. By using class-specific models, method 300 can generate better synthetic data that more accurately model the underlying actual (e.g., original) data than randomly generated training data that lacks the latent structures present in the actual data. Because the synthetic data more accurately models the underlying actual data, a data model trained using this improved synthetic data may perform better than processing the actual data.

At procedure 305, dataset generator 220 can be configured to retrieve actual data. As a non-limiting example, the actual data may have been gathered during the course of ordinary business operations, marketing operations, research operations, or the like. Dataset generator 220 can be configured to retrieve the actual data from database 215 or from another system. The actual data may have been purchased in whole or in part by an entity associated with the exemplary system. As would be understood from this description, the source and composition of the actual data is not intended to be limiting.

At procedure 310, dataset generator 220 can be configured to determine classes of the actual data. As a non-limiting example, when the actual data is account transaction data, classes can include account numbers and merchant names. As an additional non-limiting example, when the actual data is personnel records, classes can include employee identification numbers, employee names, employee addresses, contact information, marital or beneficiary information, title and salary information, and employment actions. Actual account data can also include any type of data related to a person or any information that may be used to identify an actual person. Dataset generator 220 can be configured with a classifier for distinguishing different classes of information, which can be sensitive or non-sensitive information. The classifier that identifies the class need not be sufficiently discerning to identify the subclass, relaxing the requirements on the classifier. Instead, the selection can be based on a distribution model. For example, dataset generator 220 can be configured with a statistical distribution of subclasses (e.g., a univariate distribution of subclasses) for that class and can select one of the subclasses for generating the synthetic data according to the statistical distribution. In particular, dataset generator 220 can be provided with specific examples (e.g., samples) of misclassified data samples and generate additional synthetic samples of the misclassified data (e.g., which can be of the same class) based on the class or subclass data. The generated synthetic data can be characterized by, for example, (i) the number of features m, the number of instances n, and the desired complexity, defined by the length of the class boundary, b. Once these parameters are set, n points with the values of the attributes distributed uniformly in the m-dimensional space can be generated. The class of each point can be labeled according to the specified boundary length b.

The exemplary classifier can be, or can include, a recurrent neural network for distinguishing different classes of information, which may long short term memory modules. Dataset generator 220 can be configured to apply the classifier to the actual data to determine that a sensitive portion of the training dataset belongs to the data class. For example, when the data stream includes the text string "Lorem ipsum 012-34-5678 dolor sit amet," the classifier can be configured to indicate that positions 13-23 of the text string include a potential social security number. Though described with reference to character string substitutions, the disclosed systems and methods are not so limited. As a non-limiting example, the actual data can include unstructured data (e.g., character strings, tokens, and the like) and structured data (e.g., key-value pairs, relational database files, spreadsheets, and the like).

At procedure 315, dataset generator 220 can be configured to generate an initial synthetic dataset (e.g., which can include sensitive and non-sensitive data) using a class-specific model. For example, dataset generator 220 can generate a synthetic social security number using a synthetic data model trained to generate social security numbers. This class-specific synthetic data model can be trained to generate synthetic portions similar to those appearing in the actual data. For example, as social security numbers include an area number indicating geographic information, and a group number indicating date-dependent information, the range of social security numbers present in an actual dataset can depend on the geographic origin and purpose of that dataset. A dataset of social security numbers for elementary school children in a particular school district may exhibit different characteristics than a dataset of social security numbers for employees of a national corporation. The social security-specific synthetic data model can generate the synthetic portion "03-74-3285."

If an initial synthetic dataset has already been generated, then dataset generator 220 can be used to generate additional samples of misclassified data. For example, as described herein, after a particular number of data samples have been misclassified, additional data samples of the same data type can be generated to enhance the training of a model. These additional samples can be of the same class type, which can be identified by tags on each sample in the initial synthetic dataset. Dataset generator 220 can use these tags, which identify the class type, to generate more samples of the same class. If a data sample is not tagged, then dataset generator 220 can use, for example, the classifier describes above to determine the class type of each misidentified data sample, and generate additional data samples of the same class.

Figure 4:
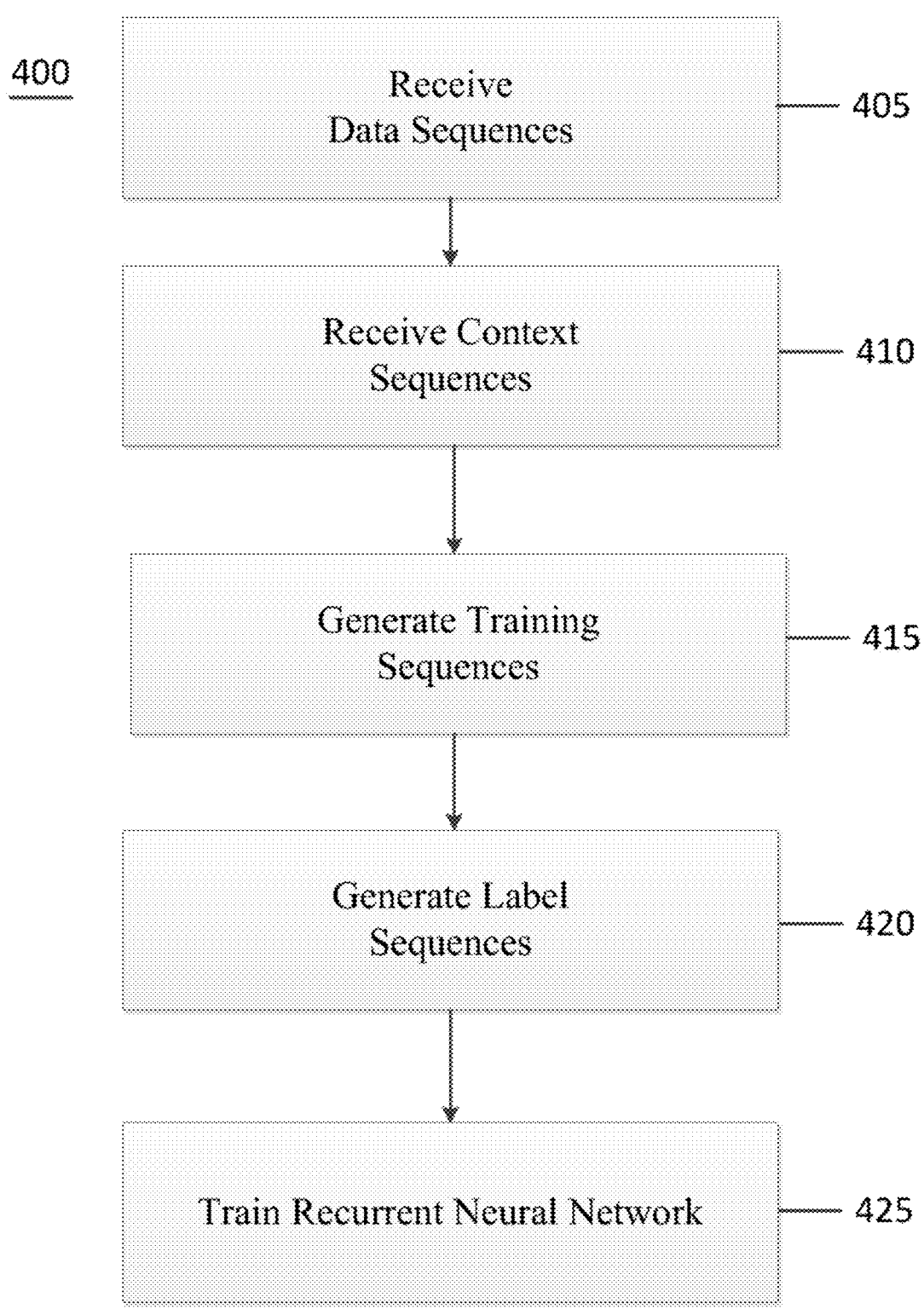
FIG. 4 is a flow diagram of a method for training a classifier for generation of synthetic data according to an exemplary embodiment of the present disclosure.

FIG. 4 shows a method 400 for training a classifier for generation of synthetic data according to an exemplary embodiment of the present disclosure. Such a classifier can be used by dataset generator 220 to classify sensitive data portions of actual data, or to determine class types of misclassified synthetic data. Method 400 can include the steps of receiving data sequences, receiving content sequences, generating training sequences, generating label sequences, and training a classifier using the training sequences and the label sequences. By using known data sequences and content sequences unlikely to contain sensitive data, method 400 can be used to automatically generate a corpus of labeled training data. Method 400 can be performed by a component of the exemplary system, such as dataset generator 220 or model optimizer 210.

At procedure 405, the exemplary system can receive training data sequences. The training data sequences can be received from a dataset. The dataset providing the training data sequences can be a component of the exemplary system (e.g., database 215) or a component of another system. The data sequences can include multiple classes of sensitive data. As a non-limiting example, the data sequences can include account numbers, social security numbers, and full names.

At procedure 410, the exemplary system can receive context sequences. The context sequences can be received from a dataset. The dataset providing the context sequences can be a component of the exemplary system (e.g., database 215) or a component of another system. In various embodiments, the context sequences can be drawn from a corpus of pre-existing data, such as an open-source text dataset (e.g., Yelp Open Dataset or the like). The context sequences can be snippets of this pre-existing data, such as a sentence or paragraph of the pre-existing data.

At procedure 415, the exemplary system can generate training sequences. The exemplary system can be configured to generate a training sequence by inserting a data sequence into a context sequence. The data sequence can be inserted into the context sequence without replacement of elements of the context sequence or with replacement of elements of the context sequence. The data sequence can be inserted into the context sequence between elements (e.g., at a whitespace character, tab, semicolon, html closing tag, or other semantic breakpoint) or without regard to the semantics of the context sequence. For example, when the context sequence is "Lorem ipsum dolor sit amet, consectetur adipiscing elit, sed do eiusmod" and the data sequence is "013-74-3285," the training sequence can be "Lorem ipsum dolor sit amet, 013-74-3285 consectetur adipiscing elit, sed do eiusmod," "Lorem ipsum dolor sit amet, 013-74-3285 adipiscing elit, sed do eiusmod," or "Lorem ipsum dolor sit amet, conse013-74-3285 ctetur adipiscing elit, sed do eiusmod." A training sequence can include multiple data sequences.

At procedure 420, system 100 can generate a label sequence. The label sequence can indicate a position of the inserted data sequence in the training sequence. The label sequence can indicate the class of the data sequence. As a non-limiting example, when the training sequence is "dolor sit amet, 013-74-3285 consectetur adipiscing," the label sequence can be "00000000000000001111111111000000000000000000 000," where the value "0" indicates that a character is not part of a sensitive data portion and the value "1" indicates that a character is part of the social security number. A different class or subclass of data sequence can include a different value specific to that class or subclass. Because the exemplary system creates the training sequences, the exemplary system can automatically create accurate labels for the training sequences.

At procedure 425, the exemplary system can be configured to use the training sequences and the label sequences to train a classifier. The label sequences can provide a "ground truth" for training a classifier using supervised learning. The classifier can be a recurrent neural network, which can include LSTM units. The recurrent neural network can be configured to predict whether a character of a training sequence is part of a sensitive data portion. This prediction can be checked against the label sequence to generate an update to the weights and offsets of the recurrent neural network. This update can then be propagated through the recurrent neural network, according to various suitable methods described in "Training Recurrent Neural Networks," 2013, by Ilya Sutskever, which is incorporated herein by reference in its entirety.

Figure 5:
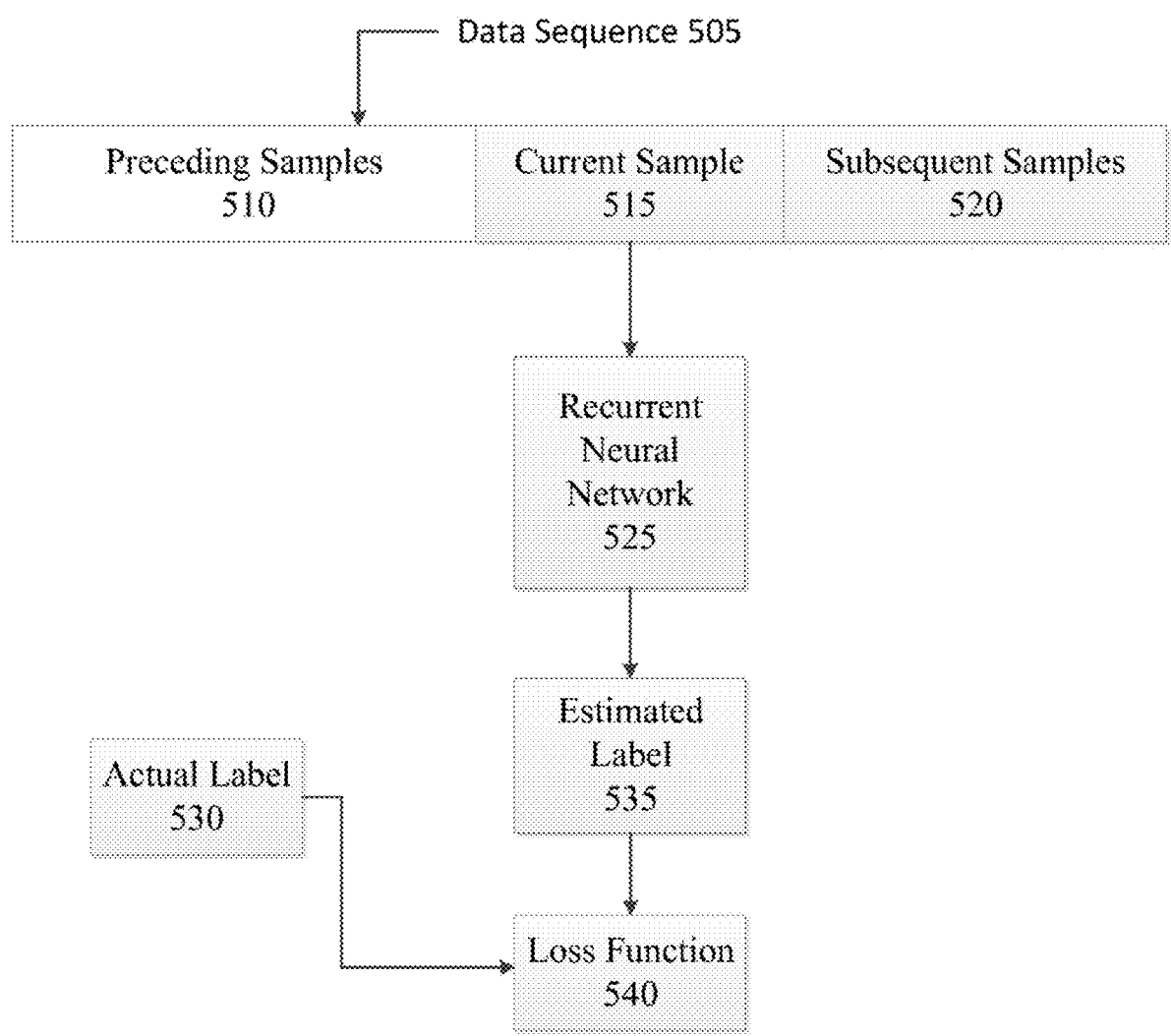
FIG. 5 is a flow diagram of a method for training a classifier for generation of synthetic data according to an exemplary embodiment of the present disclosure

FIG. 5 shows a method 500 for training a classifier for generation of synthetic data according to an exemplary embodiment of the present disclosure. As shown in FIG. 5, a data sequence 505 can include preceding samples 510, current sample 515, and subsequent samples 520. Data sequence 505 can be a subset of a training sequence. Data sequence 505 can be applied to recurrent neural network 525. Neural network 525 can be configured to estimate whether current sample 515 is part of a sensitive data portion of data sequence 505 based on the values of preceding samples 510, current sample 515, and subsequent samples 520. Preceding samples 510 can include between 1 and 100 samples, for example between 25 and 75 samples. Subsequent samples 520 can include between 1 and 100 samples, for example between 25 and 75 samples. The preceding samples 510 and the subsequent samples 520 can be paired and provided to recurrent neural network 525 together. For example, in a first iteration, the first sample of preceding samples 510 and the last sample of subsequent samples 520 can be provided to recurrent neural network 525. In the next iteration, the second sample of preceding samples 510 and the second-to-last sample of subsequent samples 520 can be provided to recurrent neural network 525. The exemplary system can continue to provide samples to recurrent neural network 525 until all of preceding samples 510 and subsequent samples 520 have been input to recurrent neural network 525. The exemplary system can then provide current sample 515 to recurrent neural network 525. The output of recurrent neural network 525 after the input of current sample 515 can be estimated label 535. Estimated label 535 can be the inferred class or subclass of current sample 515, given data sequence 505 as input. Estimated label 535 can be compared to actual label 530 to calculate a loss function. Actual label 530 can correspond to data sequence 505. For example, when data sequence 505 is a subset of a training sequence, actual label 530 can be an element of the label sequence corresponding to the training sequence. Actual label 530 can occupy the same position in the label sequence as occupied by current sample 515 in the training sequence. Consistent with disclosed embodiments, the exemplary system can be configured to update recurrent neural network 525 using loss function 540 based on a result of the comparison.

Figure 6A:
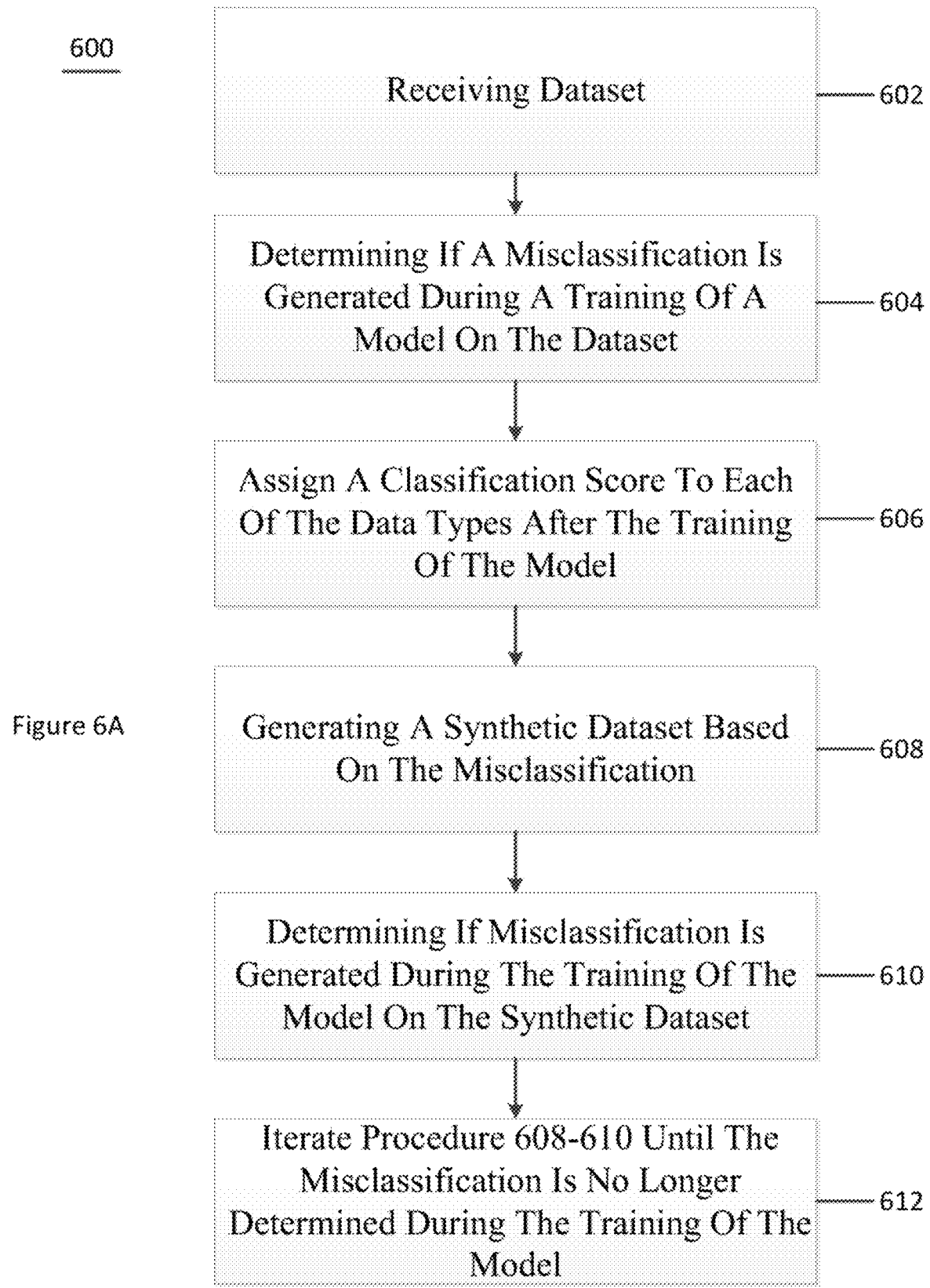
FIGS. 6A-6C are flow diagrams of methods for training a model and determining a misclassification according to an exemplary embodiment of the present disclosure.

FIG. 6A is a flow diagram of a method 600 for training a model and determining a misclassification according to an exemplary embodiment of the present disclosure. For example, at procedure 602, a dataset (e.g., a real dataset, a synthetic dataset, or a combination thereof) can be received. At procedure 604, a determination can be made as to whether a misclassification is generated during a training of a model on the dataset. At procedure 606, a classification score can be assigned to data types in the dataset after or during the training of the model. At procedure 608, a synthetic dataset can be generated based on the misclassification (e.g., the synthetic dataset can include more of the data type that has been misclassified). At procedure 610, a determination can be made as to whether the misclassification is still present during a training of the model on the synthetic dataset, which can include training on the synthetic dataset and the dataset. At procedure 612, procedures 608 and 610 can be repeated until the misclassification is no longer determined.

Figure 6B:
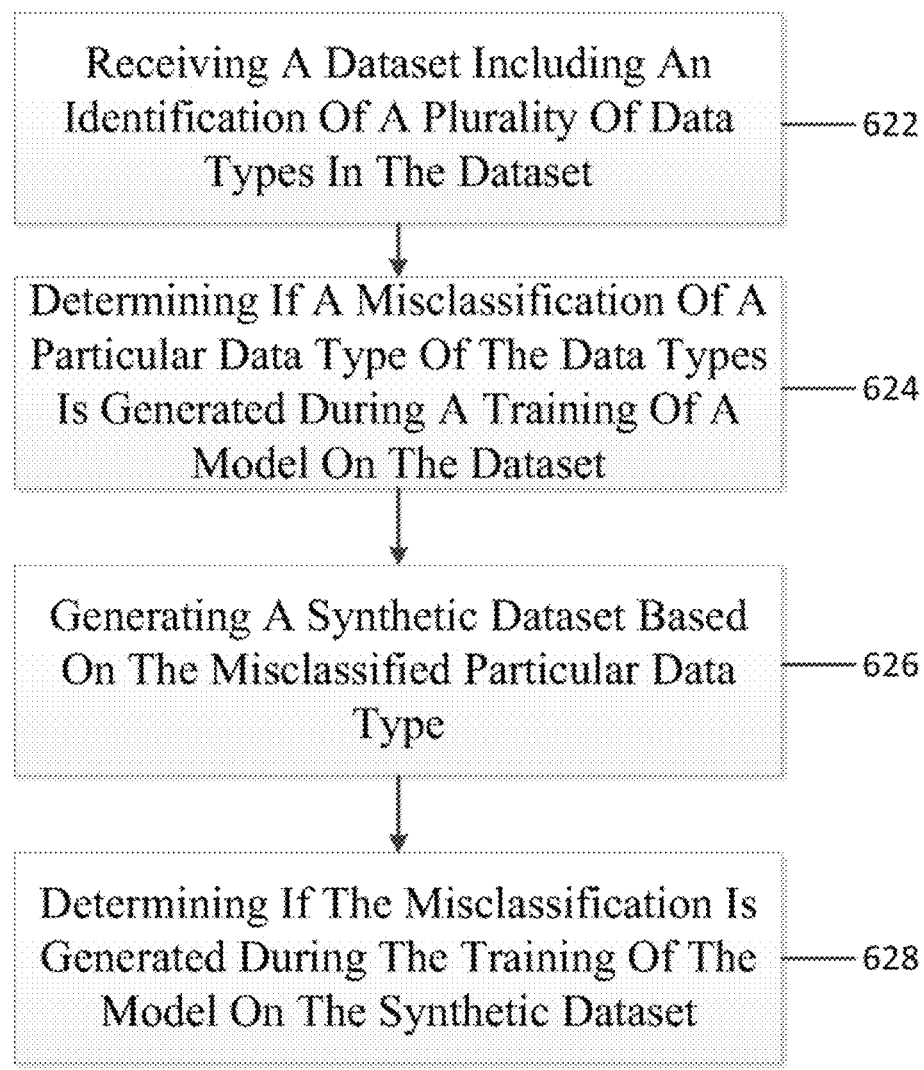

FIG. 6B is flow diagram of a method 620 for training a model and determining a misclassification according to an exemplary embodiment of the present disclosure. For example, at procedure 622, a dataset (e.g., a real dataset, a synthetic dataset, or a combination thereof), which includes an identification of a plurality of data types, can be received. At procedure 624, a determination can be made as to whether a misclassification of one of the data types is generated during a training of a model. At procedure 626, a synthetic dataset can be generated based on the misclassified data type. At procedure 628, a determination can be made as to whether the misclassification is still present during a training of the model on the synthetic dataset, which can include training on the synthetic dataset and the dataset.

Figure 6C:
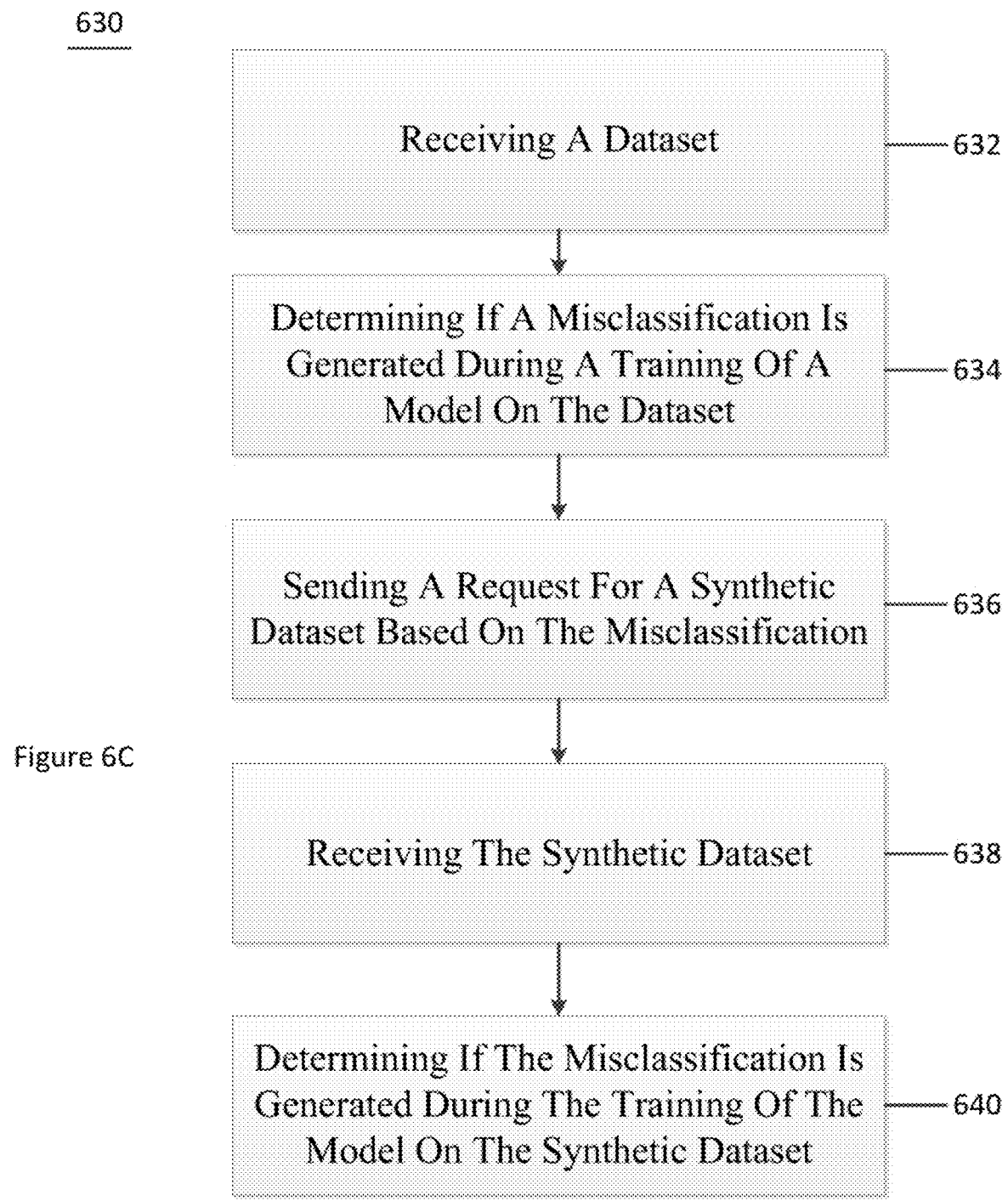

FIG. 6C is flow diagram of a method 630 for training a model and determining a misclassification according to an exemplary embodiment of the present disclosure. For example, at procedure 632, a dataset (e.g., a real dataset, a synthetic dataset, or a combination thereof) can be received. At procedure 634, a determination can be made as to whether a misclassification of one of the data types is generated during a training of a model. At procedure 636, a request for a synthetic dataset can be sent. At procedure 638, the synthetic dataset can be received. At procedure 640, a determination can be made as to whether the misclassification is still present during a training of the model on the synthetic dataset, which can include training on the synthetic dataset and the dataset.

The exemplary system, method, and computer-accessible medium can be used to enhance the accuracy of a machine learning model (e.g., by increasing certain data types or data samples of a particular type). For example, an exemplary model can be used to model customer behavior of a bank. In particular, certain customers having certain demographic or financial information can be more or less likely to engage in certain types of behavior (e.g., take out a mortgage, take out a car loan, default on a loan, not pay a credit card balance, etc.). An exemplary model can be built which can be used to predict this behavior with a particular accuracy. In order to train the model, a threshold amount of data can be needed to sufficiently train the model to achieve the particular accuracy. During the training of the model, and analysis can be performed (e.g., by the model itself or using another analysis procedure) to determine if certain samples or types of data lead to misclassifications (e.g., not enough demographic or financial information for particular type of bank customers). If certain samples or types of data lead to misclassifications, the exemplary system, method, and computer-accessible medium can generate more of these data samples to improve the accuracy of the customer behavior model.

Figure 7:
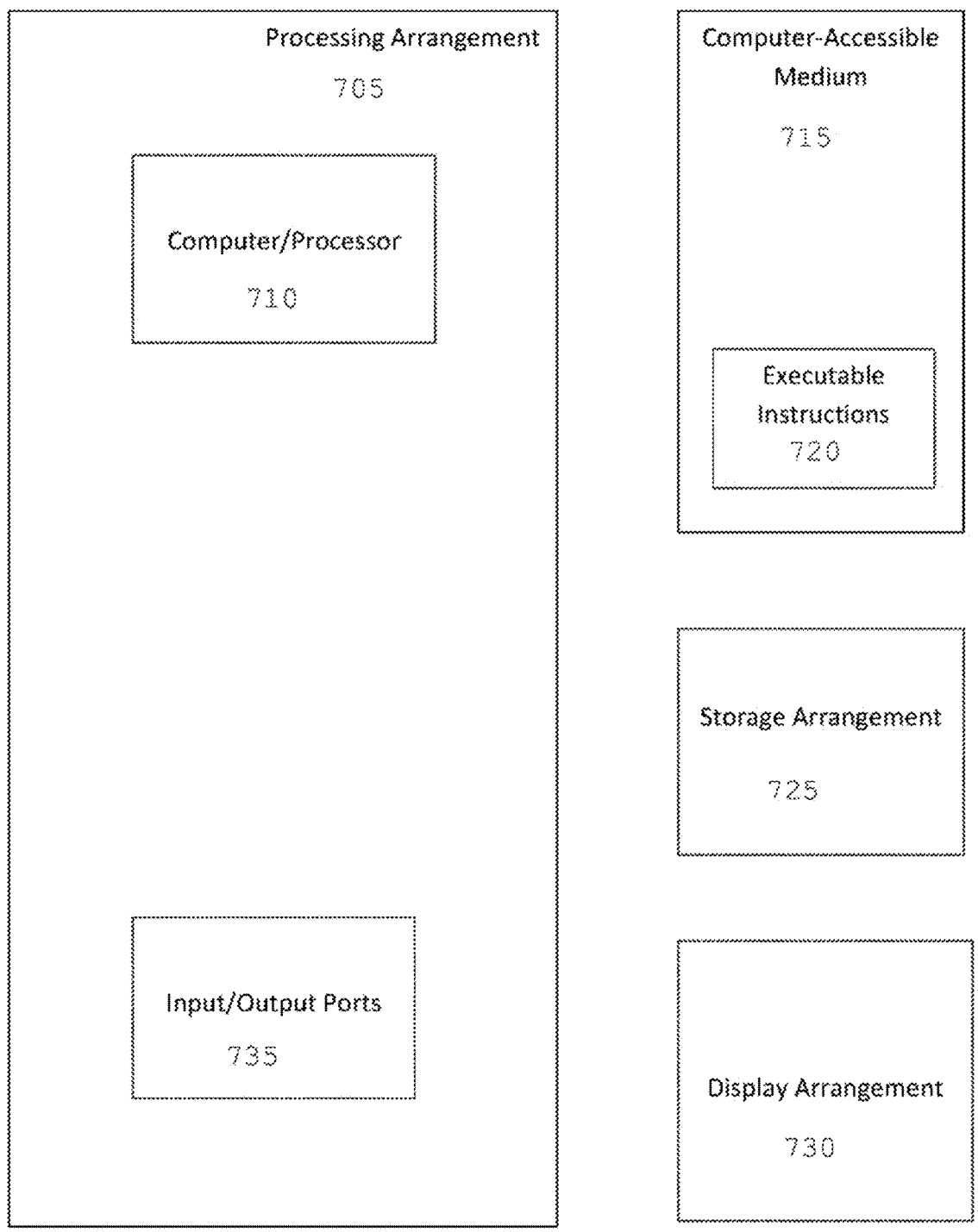
FIG. 7 is an illustration of an exemplary block diagram of an exemplary system in accordance with certain exemplary embodiments of the present disclosure.

FIG. 7 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement) 705. Such processing/computing arrangement 705 can be, for example entirely or a part of, or include, but not limited to, a computer/processor 710 that can include, for example one or more microprocessors, and use instructions stored on a computer-accessible medium (e.g., RAM, ROM, hard drive, or other storage device).

As shown in FIG. 7, for example a computer-accessible medium 715 (e.g., as described herein above, a storage device such as a hard disk, floppy disk, memory stick, CD-ROM, RAM, ROM, etc., or a collection thereof) can be provided (e.g., in communication with the processing arrangement 705). The computer-accessible medium 715 can contain executable instructions 720 thereon. In addition or alternatively, a storage arrangement 725 can be provided separately from the computer-accessible medium 715, which can provide the instructions to the processing arrangement 705 so as to configure the processing arrangement to execute certain exemplary procedures, processes, and methods, as described herein above, for example.

Further, the exemplary processing arrangement 705 can be provided with or include an input/output ports 735, which can include, for example a wired network, a wireless network, the internet, an intranet, a data collection probe, a sensor, etc. As shown in FIG. 7, the exemplary processing arrangement 705 can be in communication with an exemplary display arrangement 730, which, according to certain exemplary embodiments of the present disclosure, can be a touch-screen configured for inputting information to the processing arrangement in addition to outputting information from the processing arrangement, for example. Further, the exemplary display arrangement 730 and/or a storage arrangement 725 can be used to display and/or store data in a user-accessible format and/or user-readable format.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A non-transitory computer-accessible medium having stored thereon computer-executable instructions, wherein, when a computer arrangement executes the instructions, the computer arrangement is configured to perform procedures comprising:
    (a) receiving at least one dataset, wherein the at least one dataset includes a plurality of data types;
    (b) determining if at least one misclassification is generated during a training of at least one model on the at least one dataset by determining if one of the data types is misclassified;
    (c) assigning a classification score to each of the data types after the training of the at least one model;

(d) generating at least one synthetic dataset based on the at least one misclassification;

(e) determining if the at least one misclassification is generated during the training of the at least one model on the at least one synthetic dataset based on the assigned classification score being below a particular threshold; and (f) iterating procedures (d) and (e) until the at least one misclassification is no longer determined during the training of the at least one model.

2. The computer-accessible medium of claim 1, wherein the at least one dataset includes one of (i) only real data, (ii) only synthetic data, or (iii) a combination of real data and synthetic data.

3. The computer-accessible medium of claim 1, wherein the at least one dataset includes an identification of each of the data types in the at least one dataset.

4. The computer-accessible medium of claim 1, wherein the at least one synthetic dataset includes more data samples of a selected one of the data types than the at least one dataset, wherein the selected one of the data types is determined based on the at least one misclassification.

5. The computer-accessible medium of claim 1, wherein the at least one model is a machine learning procedure.

6. The computer-accessible medium of claim 5, wherein the machine learning procedure is a supervised machine learning procedure.

7. The computer-accessible medium of claim 1, wherein the computer arrangement is configured to generate the at least one synthetic dataset after a particular number of misclassifications has been determined.

8. The computer-accessible medium of claim 1, wherein the at least one synthetic dataset includes non-misclassified data from the at least one dataset.

9. The computer-accessible medium of claim 1, wherein the computer arrangement is configured to generate the at least one synthetic dataset after a statistical significance has been achieved based on the at least one misclassification.

10. A non-transitory computer-accessible medium having stored thereon computer-executable instructions, wherein, when a computer arrangement executes the instructions, the computer arrangement is configured to perform procedures comprising:

(a) receiving at least one dataset including an identification of a plurality of data types in the at least one dataset;

(b) determining if at least one misclassification of at least one particular data type of the data types is generated during a training of at least one model on the at least one dataset;

(c) assign a classification score to each of the data types;

(d) generating at least one synthetic dataset based on the misclassified at least one particular data type, wherein the at least one synthetic dataset includes more of the at least one particular data type than the at least one dataset;

(e) determining if the at least one misclassification is generated during the training of the at least one model on the at least one synthetic dataset based on the assigned classification score being below a particular threshold;

(f) iterating procedures (d) and (e) until the at least one misclassification is no longer determined during the training of the at least one model.

11. The computer-accessible medium of claim 10, wherein the at least one dataset includes one of (i) only real data, (ii) only synthetic data, or (iii) a combination of real data and synthetic data.

12. A method, comprising:

(a) receiving at least one dataset, wherein the at least one dataset includes a plurality of data types;

(b) determining if at least one misclassification is generated during a training of at least one model on the at least one dataset by determining if one of the data types is misclassified;

(c) assigning a classification score to each of the data types after the training of the at least one model;

(d) sending a request for at least one synthetic dataset based on the misclassification;

(e) receiving the at least one synthetic dataset;

(f) determining if the at least one misclassification is generated during the training of the at least one model on the at least one synthetic dataset based on the assigned classification score being below a particular threshold; and (g) using a computer hardware arrangement, iterating procedures (d)-(f) until the at least one misclassification is no longer determined during the training of the at least one model.

13. The method of claim 12, wherein request includes a data request for additional data related to a particular one of the data types.

14. The method of claim 13, wherein the at least one dataset includes one of (i) only real data, (ii) only synthetic data, or (iii) a combination of real data and synthetic data.

* * * * *